United States Patent
Hecker et al.

(10) Patent No.: US 11,346,412 B2
(45) Date of Patent: May 31, 2022

(54) COVER PLATE FOR A DISC BRAKE

(71) Applicant: WABCO Europe BVBA, Brussels (BE)

(72) Inventors: Jannis Hecker, Heidelberg (DE); Bernward Redemann, Hockenheim (DE); Vitalij Scherer, Leimen (DE)

(73) Assignee: WABCO Europe BVBA, Brussels (BE)

( * ) Notice: Subject to any disclaimer, the term of this patent is extended or adjusted under 35 U.S.C. 154(b) by 105 days.

(21) Appl. No.: 16/682,199

(22) Filed: Nov. 13, 2019

(65) Prior Publication Data
US 2020/0191212 A1    Jun. 18, 2020

(30) Foreign Application Priority Data

Dec. 12, 2018  (EP) .................... 18211896

(51) Int. Cl.
*F16D 66/02*       (2006.01)
*F16D 65/00*       (2006.01)
*F16D 55/22*       (2006.01)
*F16D 55/00*       (2006.01)

(52) U.S. Cl.
CPC ......... *F16D 65/0081* (2013.01); *F16D 55/22* (2013.01); *F16D 2055/0037* (2013.01)

(58) Field of Classification Search
CPC ......... F16D 2055/0037; F16D 65/0974; F16D 65/0977; F16D 66/02; F16D 66/021
See application file for complete search history.

(56) References Cited

U.S. PATENT DOCUMENTS

| | | | | |
|---|---|---|---|---|
| 4,677,420 A | * | 6/1987 | Topic | F16D 66/021 340/454 |
| 5,513,726 A | * | 5/1996 | Thompson | F16D 66/021 188/1.11 L |
| 6,345,700 B1 | * | 2/2002 | Zenzen | F16D 66/024 188/1.11 E |
| 2008/0110707 A1 | * | 5/2008 | Kromer | F16D 65/00 188/218 A |
| 2015/0041258 A1 | * | 2/2015 | Asen | F16L 3/00 188/1.11 L |

FOREIGN PATENT DOCUMENTS

| | | |
|---|---|---|
| DE | 102005060551 A1 | 6/2007 |
| DE | 102009023104 A1 | 12/2009 |
| DE | 102011012271 B3 | 6/2012 |
| EP | 2112397 A1 * 10/2009 | ............. F16D 66/02 |
| EP | 2743533 A2 | 6/2014 |
| WO | 2004046577 A1 | 6/2004 |
| WO | 2008060392 A2 | 5/2008 |

OTHER PUBLICATIONS

Machine translation of DE102011012271, retrieved Oct. 21, 2021 (Year: 2021).*

* cited by examiner

*Primary Examiner* — Bradley T King
(74) *Attorney, Agent, or Firm* — Dickinson Wright PLLC

(57) ABSTRACT

A cover panel (1) for a disc brake (2) for covering an installation opening (5) of the disc brake (2), wherein the disc brake (2) comprises a brake carrier (13) and a brake caliper (3) sliding on the brake carrier (13) axially in the direction of an application side (Z) or axially in the direction of a rim side (F).

4 Claims, 3 Drawing Sheets

COVER PLATE FOR A DISC BRAKE

TECHNICAL FIELD

The invention relates to a cover panel for disc brakes, in particular for disc brakes of utility vehicles.

BACKGROUND

Disc brakes are well known. In particular in the utility vehicle sector, disc brakes have to be designed for durability and safety. That is to say that as few components of the disc brake as possible are to be exposed to environmental influences, such as dust, rain, stone chipping or snow. For service work, or for exchanging brake pads, the disc brake has an opening in the brake caliper. The brake pads and the brake disc, inter alia, are protected only to a limited extent against environmental influences through the opening in the brake caliper. In particular on bad roads, premature wear or even damage to the brake pads or the brake disc is possible, which leads to the operating safety of the vehicle being put at risk.

In order to counteract this, DE 102009023104 A1 proposes a cover panel with radial catches which engage radially over and engage radially under the installation opening. The cover panel serves at the same time as a pad retaining clamp and also as a holding down spring of the brake pads and secures the brake pads against falling radially out of the pad carrier well of the brake carrier of the disc brake.

A further example of a cover panel is revealed in EP 2743533 B1. The cover panel rests on the brake pads via two channels. In addition, the cover panel has two openings on the rim side for receiving projections of the pad carrier. The pad retaining clamp secures the cover panel and the brake pads from dropping radially out of the disc brake.

WO 2008060392 A3 also shows a cover panel which rests on the brake pads and is secured against dropping radially out of the disc brake by means of a pad retaining clamp.

In the event that a sensor for detecting states of the brake pads is intended to be additionally arranged on the two brake pads, a cover panel for the installation opening cannot be attached. The cable of the sensor for the rim-side brake pad has to be guided via the installation opening. Currently, the cable is guided on the pad retaining clamp or along the pad retaining clamp. That is to say, both the cover panel and the sensor cable share the same construction space. The rim-side sensor and the cover panel therefore cannot be installed and used simultaneously.

SUMMARY

It is an object of the invention to provide a cover panel for a disc brake which overcomes at least some of the disadvantages from the previously mentioned prior art.

The object is achieved by a cover panel with a cable guide for fixing a cable. The combination of the cover panel and the cable guide for a pad wear sensor reduces the number of parts of a disc brake. Furthermore, the cable arranged in the cable guide is better protected by the cover panel against heat which occurs. The heat arises in particular during a braking operating during the application of the brake disc with brake pads. Too high a heat can damage the cable of the pad wear sensor and can restrict or even entirely interrupt the conducting of current, which has the result that the brake pad thickness can be detected only to a limited extent, if at all. A worn brake pad which is not detected leads to damage of the brake disc since the pad carrier, composed of metal or another material, comes into contact with the brake disc.

In a further example, the cable guide is a cable channel recessed in the cover panel. The advantage of the recessed cable channel is that the cable is additionally protected against environmental influences, such as stone material. The cable is also better protected during the installation and removal of the disc brake against breaking of the cable since the cable is not arranged freely on the cover panel.

The cable channel is advantageously variable in width. That is to say that a suitable cable channel is selected depending on the number of cables or the width of the cable.

In a further refinement, the cable guide advantageously has a sequence of fixing elements. The fixing elements can be arranged in the cable channel as additional fixing elements for retaining the cable. It is also conceivable for the cable guide to be formed by itself, without a cable channel, by the fixing elements.

In a further refinement, the fixing elements are formed directly from the cover panel by means of a forming process. Additional material or additional components are not necessary for forming the fixing elements. The fixing elements can be lugs which are formed from the cover panel and are arranged at a distance from one another. The distance between the lugs and the number of the lugs can be configured variably. For fixing on the cover panel, the cable is guided in an alternating manner over at least one lug and under at least one lug.

In a further refinement, the cable guide, starting from the application side in the direction of the rim side, is designed in the form of a labyrinth or in a straight line. With the labyrinth cable guide, the cable is fixed on the cover panel tautly and so as to be difficult to release. In particular, the use of a labyrinth cable guide is suitable when the cable, for example because of construction space, is intended, starting from the brake disc inlet side and the application side of the disc brake, to be arranged on the brake disc outlet side of the rim side of the disc brake. The brake disc inlet side should be understood as meaning the side of the disc brake in which the brake disc enters the brake caliper during a movement about its own axis. The brake disc outlet side is defined as the side of the disc brake on which the brake disc exits from the brake caliper during a revolution about its own axis. If the cable guide, starting from the application side of the disc brake toward the rim side of the disc brake, runs obliquely, the cable would be arranged too tautly in the cable guide, which can lead to premature damage, for example caused by a cable tear because of excessive stresses in the cable.

Furthermore, in a further example, the cable guide is advantageously arranged in the region of a pad retaining clamp. The pad wear sensors are generally arranged centrally in the brake pads. An arrangement of the cable guide on the cover panel outside the region of the pad retaining clamp is also conceivable, but would mean that both a longer cable and a longer cable guide are necessary.

As already mentioned in the exemplary examples, in a particularly preferred refinement the cable is a pad wear sensor cable of a pad wear sensor for detecting the pad thickness of the brake pads. The brake pad wear sensor is preferably what is referred to as a black/white sensor which is arranged on the rim-side brake pad of the disc brake. The cable is connected to the black/white sensor. A voltage is applied to the cable. As soon as the brake disc severs the cable of the pad wear sensor, the voltage is interrupted and a control unit on the application side of the disc brake detects that the brake pad has to be changed.

In a further example, the cover panel is a sheet metal formed part. Sheet metal can be very readily formed, cut and drilled. In particular when the cable guide is designed as a cable channel or the lugs are formed for fixing the cable, simple machining of the cover panel is advantageous. The cable channel for the cable guide can be punched and, after the punching operation, the lugs can subsequently be very simply bent in the desired direction by forming.

In order to arrange the cover panel on a brake caliper of the disc brake, in a further example the cover panel has at least supporting elements and securing elements for fixing the cover panel on the pad retaining clamp.

In a further refinement, the securing elements of the cover panel are recessed radially in the direction of the brake disc in relation to retaining struts of the cover panel. Recesses are punched out in the cover panel, such that the retaining struts remain. However, the cover panel can also be fixed directly on the brake caliper, for example via a tongue/groove connection. Furthermore, it is conceivable for projections to be arranged on the brake disc inlet side of the cover panel and on the brake disc outlet side of the cover panel, the projections gripping in the brake caliper via the installation opening and fixing the cover panel against dropping out of the brake caliper radially.

In a further refinement, the cover panel has screws for fixing on the disc brake. The cover panel can be fixed directly on the pad retaining clamp or else on the brake caliper by means of the screws. Retaining struts are particularly preferably arranged for holding the cover panel against dropping radially out of the brake caliper. In addition to the retaining struts, screws are arranged on the retaining struts, the screws securing the cover panel against a vertical movement.

In a further example, the screws fix the cover panel on the pad retaining clamp. Separate machining of the brake caliper by introducing drill holes for receiving the screws is avoided.

The object is furthermore achieved by a disc brake with a cover panel according to one of the preceding examples.

The drawings are provided herewith for purely illustrative purposes and are not intended to limit the scope of the present invention.

DETAILED DESCRIPTION OF THE DRAWINGS

Figure 1:
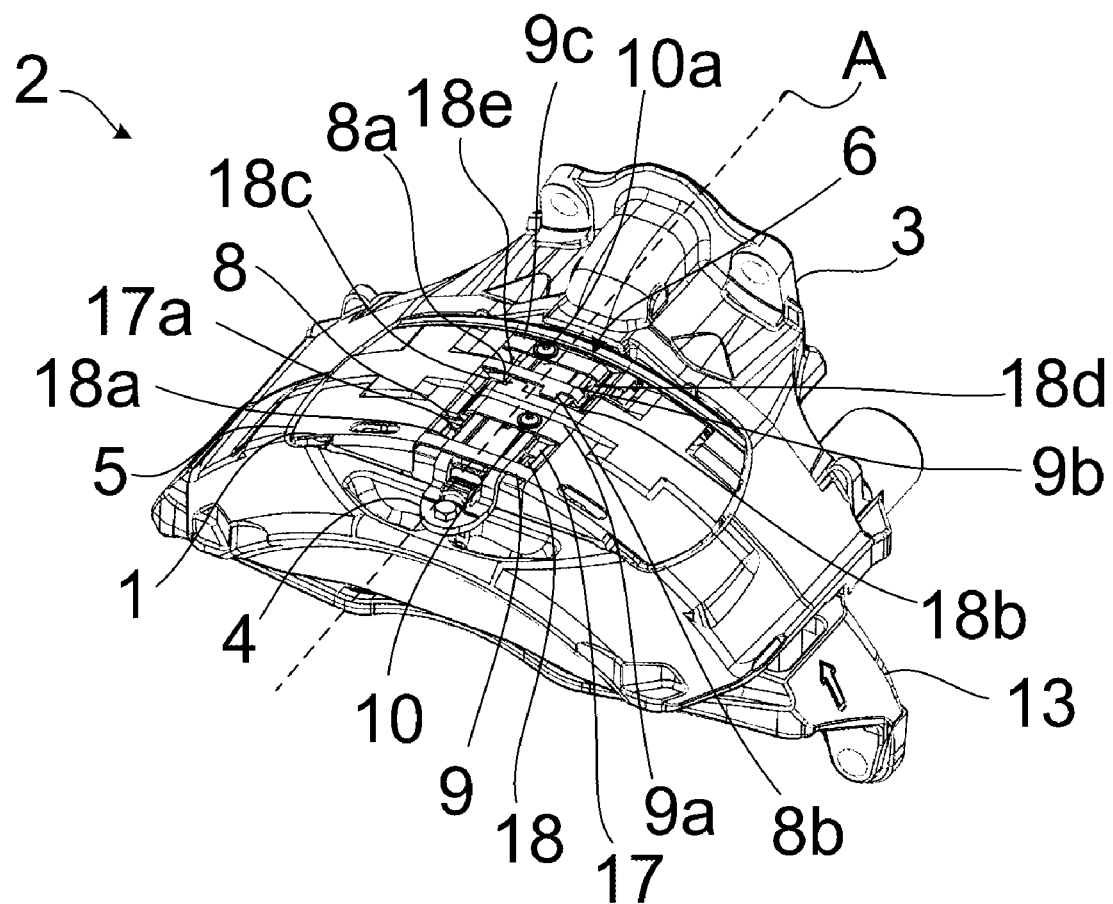
FIG. 1 shows a disc brake with a cover panel in a laterally rotated view.
Figure 3:
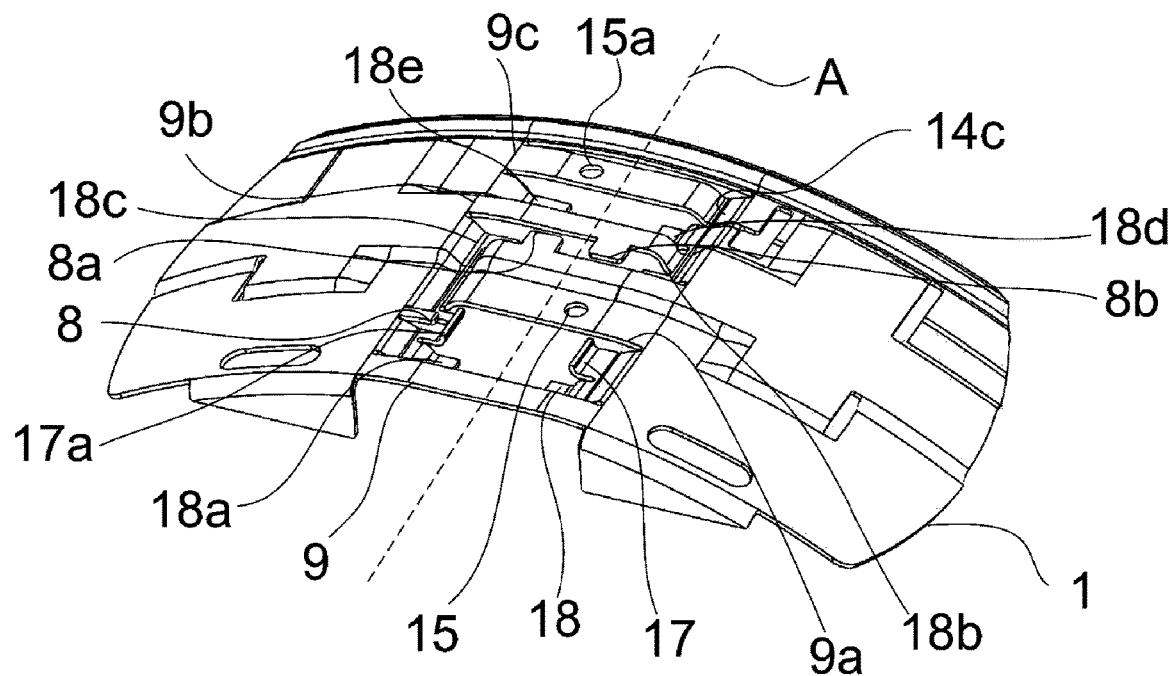
FIG. 3 shows a cover panel with a cable guide.
Figure 4:
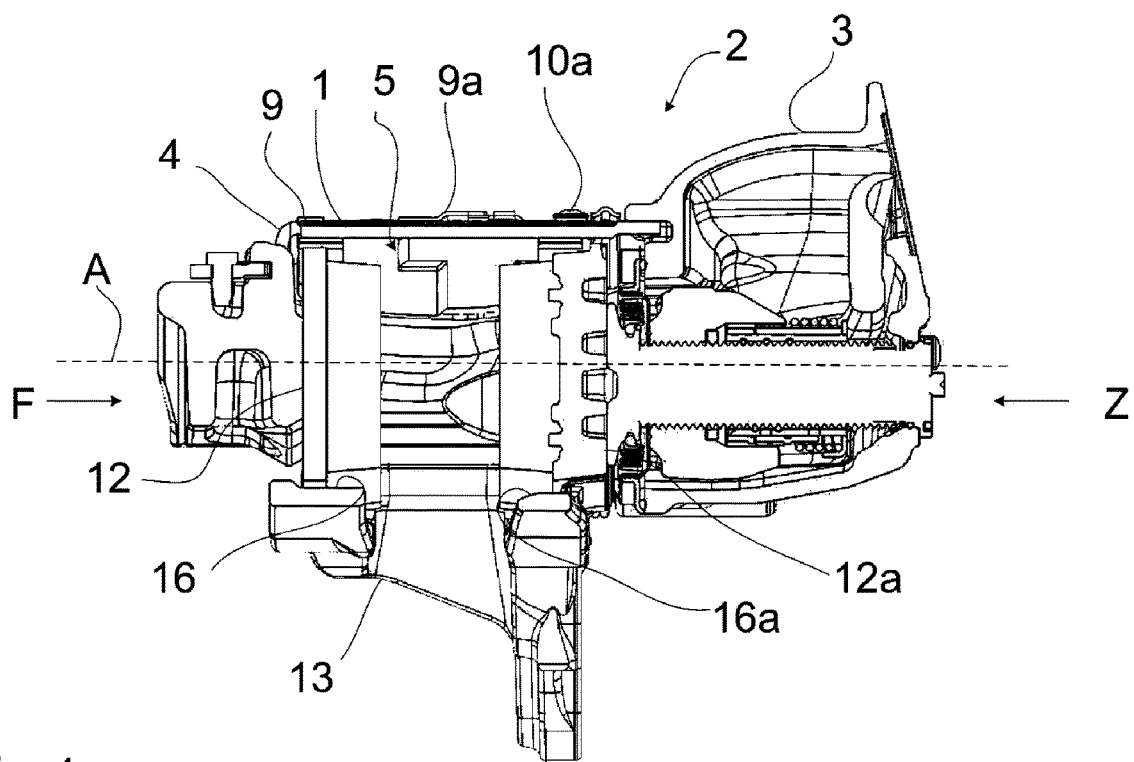
FIG. 4 shows a sectioned side view of a disc brake with a cover panel.

FIG. 1 shows a disc brake 2 with a cover panel 1 according to the invention. A cable guide 6 is integrated in the cover panel 1. The cover panel 1 covers an installation opening 5 of a brake caliper 3 for removing and for fitting brake pads 12, 12a. The brake pads 12, 12a are illustrated in FIG. 4. The brake caliper 3 is arranged on a brake carrier 13, wherein the brake caliper 3 is mounted on the brake carrier 13 so as to be displaceable axially along the disc brake axis A. Furthermore, the cover panel 1 is arranged on the brake caliper 3 radially with respect to a disc brake axis A. In order to fix the cover panel 1 on the disc brake 2, the cover panel 1 has what are referred to as retaining struts 9, 9a, 9b, 9c. The retaining struts 9, 9a, 9b, 9c and the cable guide 6 are formed from the cover panel 1 by means of forming and punching. The retaining struts 9, 9a, 9b, 9c run coaxially along the disc brake axis A. A pad retaining clamp 4 secures the brake pads 12, 12a against dropping radially out of a brake pad carrier well 16, 16a (see FIG. 4) of the brake carrier 13. The retaining struts 9, 9a, 9b, 9c span the pad retaining clamp 4. Two screws 10, 10a additionally secure the cover panel 1 against moving radially with respect to the disc brake axis A. The screw 10 is connected to the pad retaining clamp 4 via a bore 15 in the retaining strut 9a. The second screw 10a is connected to the pad retaining clamp 4 via a bore 15a in the retaining strut 9c. The bore 15 of the retaining strut 9a and the bore 15a of the retaining strut 9c are illustrated in FIG. 3. Between the retaining struts 9, 9a, 9b, 9c, a fixing element 8 is arranged as cable guide 6 on the cover panel 1 and two further fixing elements 8a, 8b are arranged on the retaining struts 9a, 9b. Supporting elements 17, 17a of the cover panel 1 engage under the pad retaining clamp 4 and secure the cover panel 1 in the radial direction opposite the brake disc. The cover panel 1 is supported in the tangential direction on the pad retaining clamp 4 by means of securing elements 18, 18a, 18b, 18c, 18d, 18e.

Figure 2:
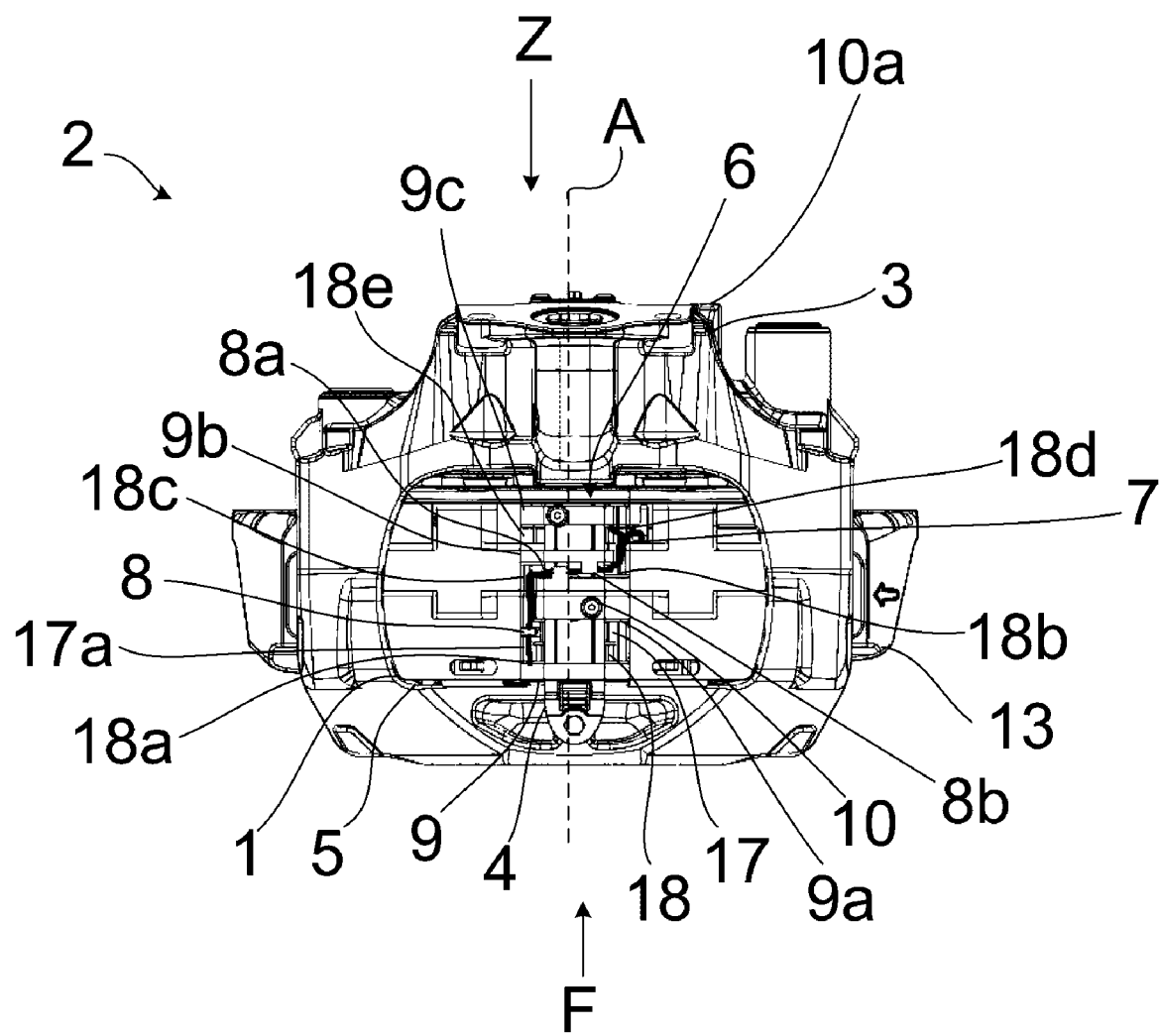
FIG. 2 shows a disc brake with a cover panel and a sensor cable from a top view.

FIG. 2 shows the disc brake 2 according to FIG. 1 in top view. In FIG. 2, a cable 7 is additionally arranged in the cable guide 6 of the cover panel 1. The cable 7 is a pad wear sensor cable and is arranged in the cable guide 6 axially along the disc brake axis A, from an application side Z of the disc brake 2 in the direction of a rim side F of the disc brake 2. The cable 7 is clamped in the manner of a labyrinth between the fixing elements 8, 8a, 8b.

FIG. 3 shows the cover panel according to FIG. 1 and FIG. 2 in detail. In particular, the bore 15 in the retaining strut 9a for fixing the screw 10 and the bore 15a in the retaining strut 9c for fixing the screw 10a are visible. In particular, the arrangement of the securing elements 18, 18a, 18b, 18c, 18d, 18e and the arrangement of the supporting elements 17, 17a can be seen.

FIG. 4 shows the disc brake 1 in a laterally sectioned view. FIG. 4 once again illustrates the covering of the installation opening 5 by the cover panel 1, as a result of which the brake pads 12, 12a and the brake disc, which is arranged between the brake pads 12, 12a but is not shown, are protected against environmental influences, such as dust or snow.

While the above description constitutes the preferred example of the present invention, it will be appreciated that the invention is susceptible to modification, variation and change without departing from the proper scope and fair meaning of the accompanying claims.

LIST OF REFERENCE SIGNS AS USED IN THE DESCRIPTION

1 Cover panel
2 Disc brake
3 Brake caliper
4 Pad retaining clamp
5 Installation opening
6 Cable guide
7 Cable
8-8b Fixing elements
9-9c Retaining struts
10, 10a Screws
12, 12a Brake pads
13 Brake carrier 15 Bore of the retaining strut 9a
15a Bore of the retraining strut 9c
16, 16a Brake pad carrier well
17-17a Supporting elements of the cover panel 1
18-18e Securing elements of the cover panel 1
A Disc brake axis
F Rim side
Z Application side

What is claimed is:

1. A disc brake (2) comprising:
   a brake carrier (13);
   a brake caliper (3) sliding on the brake carrier (13) axially toward an application side (Z) or axially toward a rim side (F);
   an installation opening (5) defined in the brake caliper (3) for removing and for fitting brake pads; and
   a cover panel (1);
   wherein the cover panel (1) includes a cable guide (6) for fixing a cable (7);
   wherein the cover panel (1) extends substantially across an axial width and a circumferential length of the installation opening and substantially covers the installation opening, wherein the cover panel extends across substantially the entire installation opening;
   wherein the cover panel includes a plurality of spaced apart fixing elements along the cable guide for securing a cable in the cable guide, wherein cable guide, cover panel, and the fixing elements are monolithically formed as a one-piece homogenous structure.

2. The disc brake (2) of claim 1, wherein the cover panel extends fully across the circumferential length of the installation opening.

3. The disc brake (2) of claim 1, wherein a circumferential length of the cover panel is greater than an axial width of the cover panel.

4. The disc brake (2) of claim 1, wherein the cover panel defines a curvature corresponding to a curvature of the brake caliper (13) such that the brake caliper and the cover panel combine to define a generally continuous curvature.

* * * * *